United States Patent
Wu et al.

(10) Patent No.: US 6,936,353 B1
(45) Date of Patent: Aug. 30, 2005

(54) TILTED RECORDING MEDIUM DESIGN WITH (101-2) ORIENTATION

(75) Inventors: Zhong Stella Wu, Fremont, CA (US); Qixu David Chen, Milpitas, CA (US); Samuel D. Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 62 days.

(21) Appl. No.: 10/611,308

(22) Filed: Jul. 2, 2003

(51) Int. Cl.[7] ................................................. G11B 5/66
(52) U.S. Cl. ...................... 428/611; 428/669; 428/670; 428/686; 428/212; 428/694 T; 428/694 TS
(58) Field of Search ............................... 428/611, 669, 428/670, 686, 212, 694 T, 694 TS

(56) References Cited

U.S. PATENT DOCUMENTS

| | | | |
|---|---|---|---|
| 3,950,787 A | | 4/1976 | Hosaka |
| 4,210,946 A | * | 7/1980 | Iwasaki et al. ............. 360/131 |
| 4,525,754 A | | 6/1985 | Handley |
| 4,672,479 A | | 6/1987 | Takao et al. |
| 4,713,703 A | | 12/1987 | Asano |
| 4,807,055 A | | 2/1989 | Tsunoda et al. |
| 4,829,387 A | | 5/1989 | Kato |
| 4,907,102 A | | 3/1990 | Tsunoda et al. |
| 5,166,843 A | | 11/1992 | Kuwajima |
| 5,343,348 A | | 8/1994 | Nishima et al. |
| 5,492,774 A | | 2/1996 | Tateno et al. |
| 5,605,733 A | | 2/1997 | Ishikawa et al. |
| 5,665,460 A | | 9/1997 | Sugita et al. |
| 5,851,643 A | | 12/1998 | Honda et al. |
| 6,063,489 A | | 5/2000 | Kobayashi et al. |
| 6,081,403 A | | 6/2000 | Uetake et al. |
| 6,163,421 A | | 12/2000 | Shinpuku et al. |
| 6,426,850 B1 | | 7/2002 | Mizuno et al. |
| 6,500,567 B1 | | 12/2002 | Bertero et al. |
| 6,671,116 B2 | * | 12/2003 | Akagi et al. .................. 360/55 |
| 2003/0017364 A1 | * | 1/2003 | Kikitsu et al. .............. 428/693 |

FOREIGN PATENT DOCUMENTS

| | | | |
|---|---|---|---|
| JP | 55-091105 A | * | 7/1980 |
| JP | 08-007250 A | * | 1/1996 |

OTHER PUBLICATIONS

EPO Abstract of Japan of JP 08–007250–A (Pub. Num: 08007250).*
Machine Translation of JP 08–007250–A.*
Derwent Abstract Translation of JP 55–091105–A (Der. Acc. No. 1980–59620C).*

* cited by examiner

Primary Examiner—Kevin M. Bernatz
(74) Attorney, Agent, or Firm—Morrison & Foerster LLP

(57) ABSTRACT

Magnetic recording media having a magnetic layer with an easy magnetization axis lying about 45° out of plane of the magnetic layer is disclosed. SMNR from this media could be greatly improved from conventional longitudinal and perpendicular recording, because of an increase in the grain anisotropy that could be effectively written due to the angled recording configuration, resulting also in higher thermal stability, therefore, suitable for higher areal density recording.

16 Claims, 5 Drawing Sheets

Carbon overcoat

Co-alloy magnetic layer with Co (101-2) orientation

Underlayer

Substrate

Protective overcoat 23

Magnetic layer 22

Underlayer 21

Substrate 20

Underlayer 21'

Magnetic layer 22'

Protective overcoat 23'

Carbon overcoat

Co-alloy magnetic layer with Co (101-2) orientation

Underlayer

Substrate

TILTED RECORDING MEDIUM DESIGN WITH (101-2) ORIENTATION

FIELD OF INVENTION

This invention relates to magnetic recording media, such as thin film magnetic recording disks, and to a method of manufacturing the media. The invention has particular applicability to high areal density magnetic recording media having very low medium noise.

BACKGROUND

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

The increasing demands for higher areal recording density impose increasingly greater demands on thin film magnetic recording media in terms of coercivity (Hc), remanent coercivity (Hr), magnetic remanance (Mr), which is the magnetic moment per unit volume of ferromagnetic material, coercivity squareness (S*), signal-to-medium noise ratio (SMNR), and thermal stability of the media. These parameters are very important to the recording performance and they depend primarily on the microstructure of the materials of the media. For example, as decreasing the grain size reduces the SMNR or reducing exchange coupling between grains, it has been observed that the thermal stability of the media decreases.

The requirements for high areal density, i.e., higher than 30 Gb/in$^2$, impose increasingly greater requirements on magnetic recording media in terms of coercivity, remanent squareness, medium noise, track recording performance and thermal stability. It is extremely difficult to produce a magnetic recording medium satisfying such demanding requirements, particularly a high-density magnetic rigid disk medium for longitudinal and perpendicular recording.

As the storage density of magnetic recording disks has increased, the product of Mr and the magnetic layer thickness t has decreased and Hr of the magnetic layer has increased. This has led to a decrease in the ratio Mrt/Hr. To achieve a reduction in Mrt, the thickness t of the magnetic layer has been reduced, but only to a limit because the magnetization in the layer becomes susceptible to thermal decay and medium noise.

Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

Longitudinal magnetic recording media containing cobalt (Co) or Co-based alloy magnetic films with a chromium (Cr) or Cr alloy underlayer deposited on a non-magnetic substrate have become the industry standard. For thin film longitudinal magnetic recording media, the desired crystallized structure of the Co and Co alloys is hexagonal close packed (hcp) with uniaxial crystalline anisotropy and a magnetization easy direction along the c-axis that lies in the plane of the film. The better the in-plane c-axis crystallographic texture, the more suitable is the Co alloy thin film for use in longitudinal recording to achieve high remanence and coercive force. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains thereby decreasing intergranular exchange coupling. This type of microstructural and crystallographic control is typically attempted by manipulating the deposition process, and proper use of underlayers and seedlayers.

It is recognized that the magnetic properties, such as Hcr, Mr, S and SMNR, which are critical to the performance of a magnetic alloy film, depend primarily upon the microstructure of the magnetic layer, which, in turn, is influenced by the underlying layers, such as the underlayer. It is also recognized that underlayers having a fine grain structure are highly desirable, particularly for growing fine grains of hcp Co alloys deposited thereon.

For high signal to noise ratio (SNR) magnetic recording media, it is desirable to have a high signal in a very thin film. Higher signal can be achieved by increasing the saturation magnetization (Ms) of the material at the top of the magnetic layer, and correspondingly increasing the fringing magnetic field that provides signal. Prior art magnetic recording systems generally employ media including a magnetic layer alloy including Co and Cr, and other elements often including Pt, and B. These magnetic layer systems generally require 10–25% Cr, and often use 5–15% B in order to isolate the magnetic grains in the magnetic layer and reduce noise.

There exists a continuing need for high areal density longitudinal magnetic recording media exhibiting high Hcr and high SMNR while overcoming the deficiencies of the prior art solutions.

SUMMARY OF THE INVENTION

The invention relates to a recording medium and method of manufacturing the media. The media comprises a magnetic layer comprising a magnetic material comprising an hcp lattice having a (101-2) plane, wherein an easy magnetization axis in the magnetic layer is tilted away from the (101-2) plane. Current recording media designs utilize magnetization with easy axis either in the disk plane (longitudinal recording) or perpendicular to the disk plane (perpendicular recording) for storing data. This invention produces a recording media with the easy magnetization axis lying about 45° tilted out of plane. Thus, media SNR could be greatly improved from conventional longitudinal and perpendicular recording, because of an increase in the grain anisotropy that could be effectively written due to the angled recording configuration. A media structure design to achieve this tilted magnetization configuration is disclosed.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
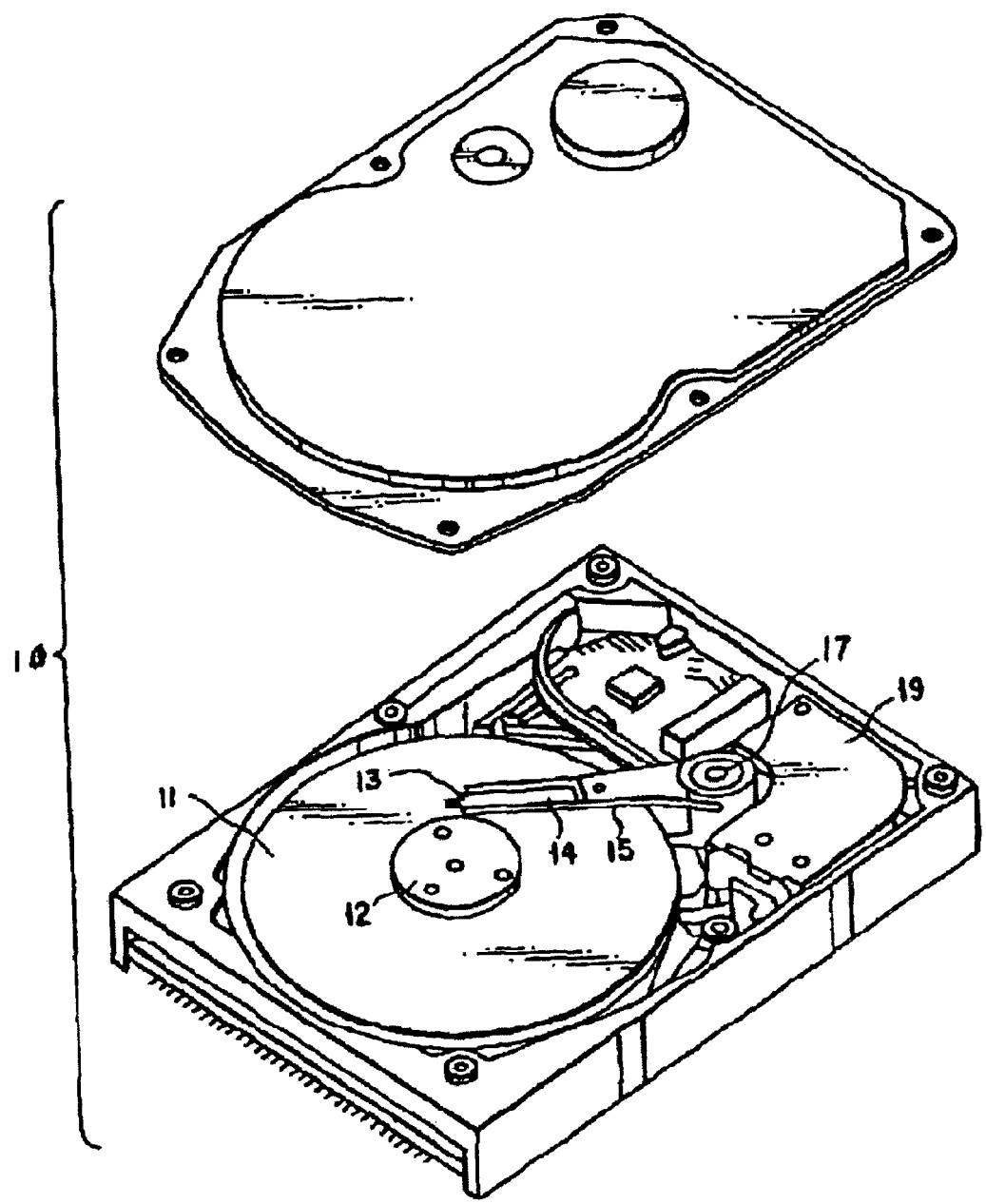
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball or fluid bearings (not shown) provided at the upper and lower portions of a pivot portion 17.

Figure 2:
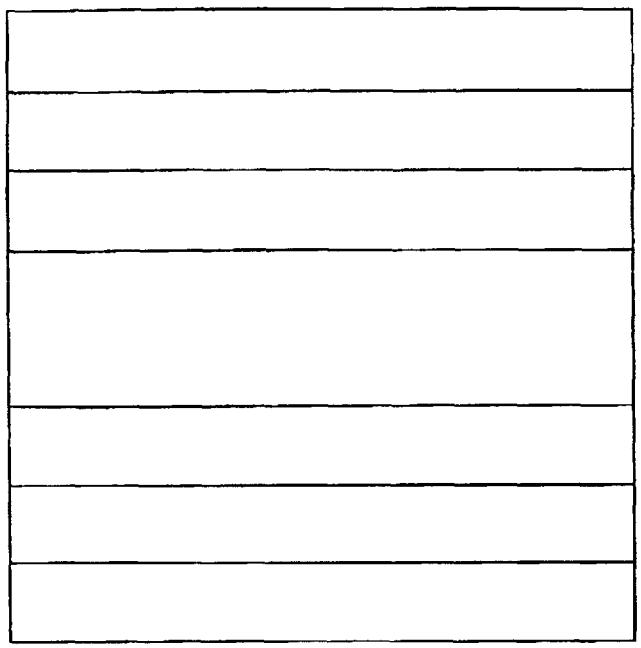
FIG. 2 is a schematic representation of the film structure in accordance with a magnetic recording medium of the prior art.

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. General practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by techniques normally comprises polycrystallites epitaxially grown on the polycrystal Cr or Cr-containing underlayer.

A longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Methods for manufacturing a longitudinal magnetic recording medium with a glass, glass-ceramic, Al or Al—NiP substrate may also comprise applying a seed layer between the substrate and underlayer. A seed layer seeds the nucleation of a particular crystallographic texture of the underlayer. A seed layer is the first deposited layer on the non-magnetic substrate. The role of this layer is to texture (alignment) the crystallographic orientation of the subsequent Cr-containing underlayer.

The seed layer, underlayer, and magnetic layer are conventionally sequentially sputter deposited on the substrate in an inert gas atmosphere, such as an atmosphere of argon. A carbon overcoat is typically deposited in argon with nitrogen, hydrogen or ethylene. Lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

Longitudinal magnetic recording media having Cr(200) and Co(11.0) preferred orientations are usually referred as bi-crystal media. Here, Cr(200) refers to bcc (body centered cubic) structured Cr-alloy underlayer or B2-structured underlayer with (200) preferred orientation. Generally, bi-crystal media have narrower c-axis dispersion than that of uni-crystal media. Therefore, bi-crystal media are more desirable than uni-crystal media, which have Co(10.0) preferred orientations. Typical bi-crystal media comprise Cr-containing alloy underlayers and Co-alloy magnetic layers. Cr-containing alloy has body centered cubic crystalline structure.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by using a magnetic layer comprising a magnetic material with an hcp (101-2) plane lying in the film surface, wherein an easy magnetization axis in the magnetic layer, the (0002) axis, is tilted away from the film plane. Preferably, the (101-2) plane is a Co(101-2) plane.

Figure 3:
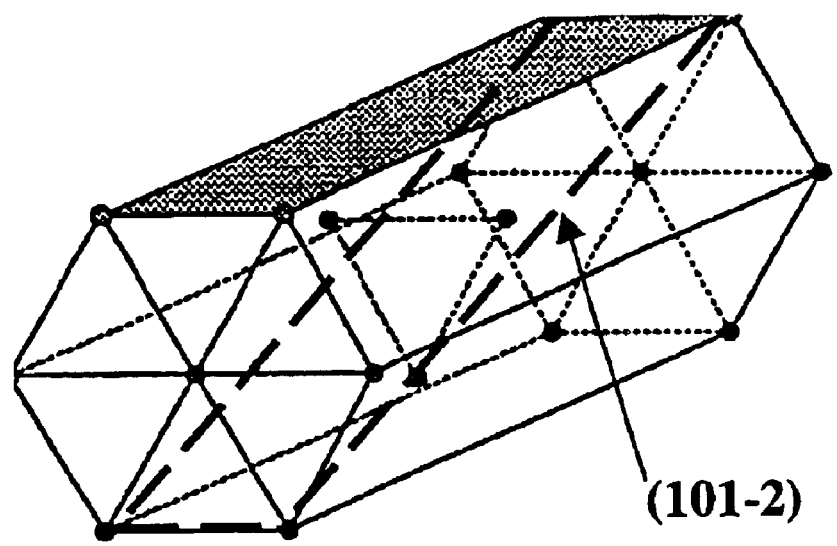
FIG. 3 shows the hexagonal closed packed lattice of Co with the long dashed lines showing the (101-2) plane.
Figure 4:
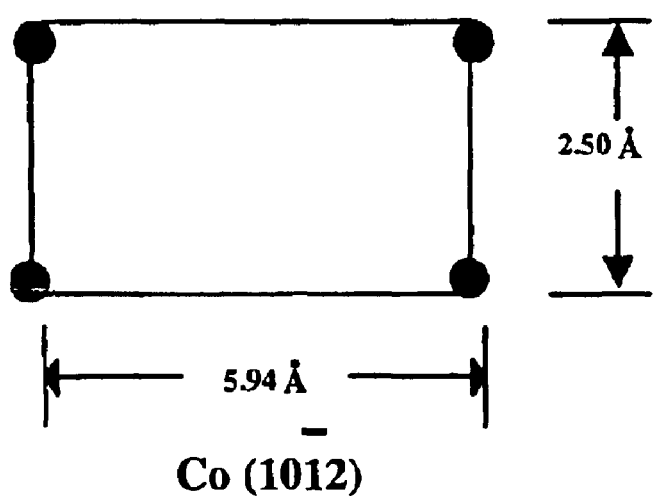
FIG. 4 shows a lattice unit for the (101-2) plane with both lattice constants.
Figure 5:
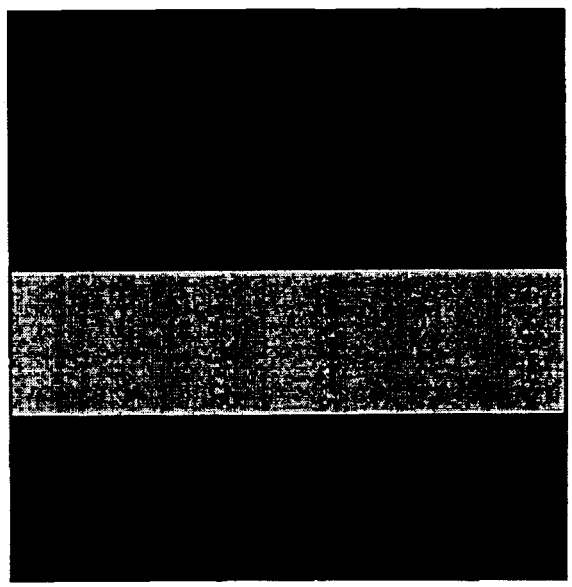
FIG. 5 shows an embodiment of the film structure according to the current invention.

The hexagonal closed packed lattice of Co is shown in FIG. 3 with the long dashed lines showing the (101-2) plane. A lattice unit for the (101-2) plane with both lattice constants is shown in FIG. 4. Co (101-2) has the lengths of the unit cell 2.5 Å and 5.9 Å, respectively. By using an appropriate underlayer with surface plane matching this lattice unit, Applicants could grow Co film with (101-2) orientation by epitaxy. Since Co has magnetic easy axis along c-axis that is 46.84° away from the (101-2) plane, Applicants could achieve a tilted recording media.

In this application, word "containing" means that the layer comprises the elements or compounds before the word "containing" but the layer could still include other elements and compounds.

The Co-containing magnetic layer can comprise any Co-based alloy such as CoCrPt, CoCrPtTa, CoCrPtTaNb, and CoCrPtB. The magnetic layer can be single magnetic layer or dual magnetic layers immediately adjacent to each other.

In a variation, there could further be seedlayer(s) of about 1.0 nm to about 160 nm thickness below this underlayer to nucleate growth for Al, glass or other substrate. A portion of the seed layer(s) and/or the underlayer(s) could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include Al, glass, glass-ceramic, plastic/polymer material, ceramic, glass-polymer or composite materials.

Desirably, the lattice constant and the crystal plane of the seedlayer(s), if used, should closely match that of the seed layer. Similarly, matching between other layers, except with carbon overcoat, is also desirable. As a consequence of lattice and crystalline plane matching, the magnetic layer, in turn, will grow in a close-packed hexagonal structure with a Co (101-2) crystallographic orientations predominantly parallel to the film plane with the magnetic easy axis, c-axis, lying predominantly 46.84° away from the film plane.

In a preferred embodiment, the thickness of the optional seed layer could be about 10 Å to about 1600 Å. The thickness of varying underlayer could be about 10 Å to about 500 Å, preferably between about 20 Å and about 200 Å. The thickness of the magnetic layer could be about 5 Å to about 300 Å, preferably between about 35 Å and about 175 Å, and most preferably about 50–150 Å The thickness of the intermediate layer between this underlayer and Co-containing magnetic layer, if used, could be about 10 Å to about 60 Å, preferably between about 15 Å and about 50 Å, and most preferably about 20–25 Å. The thickness of the protective layer could be about 20 Å to about 300 Å, preferably between about 20 Å and 100 Å, and most preferably about 30 Å. The protective layer could be made of hydrogenated carbon, nitrogenated carbon, hybrid carbon, or a combination of them.

The magnetic recording medium has a remanent coercivity of about 3000 to about 10,000 Oersted, and an Mrt (product of remanance, Mr, and magnetic layer thickness, t) of about 0.2 to about 2.0 memu/cm$^2$. In a preferred embodiment, the coercivity is about 3500 to about 7000 Oersted, more preferably in a range of about 4000 to about 6000 Oersted. In a preferred embodiment, the Mrt is about 0.25 to about 1 memu/cm$^2$, more preferably in a range of about 0.3 to about 0.6 memu/cm$^2$, and most preferably in a range of about 0.3 to about 0.45 memu/cm$^2$.

EXAMPLES

The examples relate to a method and apparatus for a magnetic recording media with a magnetic layer having high Ms and low noise. All samples described in this disclosure could be fabricated with DC magnetron sputtering.

An example of the film structure of the magnetic recording media in accordance with the present invention is shown in FIG. 3. An example of the appropriate underlayer material is Ni that has fcc crystalline structure with lattice constant of 3.52 Å. By using single crystal Ni (221) or grown film of Ni (221), the surface plane will have a rectangular lattice with dimensions of 2.49 Å and 6.1 Å, respectively. Since these two lengths of the unit cell have very small mismatch with that of Co (101-2) —less than 1% and 4%—it will be easy to grow Co (101-2) on top of it through epitaxy, and achieve a magnetic layer with easy axis 46.84° from the film plane for the tilted recording. Cu has 3.61 Å lattice constant, and Cu (221) has 2.55 Å and 6.25 Å, respectively, and is another plane that matches Co(101-2) very well.

Other fcc materials including Al, Rh, Pd, Ag, Ir, Pt and Au, having lattice constants ranging from 3.8 to 4.09 Å, having (111) plane matching Co (101-2) very well, with lattice mismatch all below 9%. In addition, by alloying, their (111) planes could be further tuned for better lattice matching for Co or Co-alloy as magnetic layer.

The third example is a group of elements including Pb, Th, Ce and Yb, which have fcc lattice constants varying from 4.95 to 5.48 Å. Their (210) planes match very well with Co (101-2) plane with less than 10%, in most cases, less than 6% mismatch.

The magnetic material for this disclosure includes pure Co, and its alloys, with single or multiple elements choosing from the group but not limited to the group of Cr, Ni, Pt, Ta, B, Nb.

The steps for manufacturing the media are: (1) Depositing an orienting underlayer(s) on a substrate. (2) Depositing a magnetic layer, typically a CoCrXYZ alloy magnetic layer wherein X, Y and Z are elements on the underlayer(s). (3) Depositing a protective overcoat.

Optional additional steps include depositing additional layers such as a seedlayer layer directly on the substrate or an intermediate layer between the seedlayer and the underlayer or between the underlayer and the magnetic layer. The magnetic recording media could further comprise a soft magnetic underlayer. In a variation, a heating step is performed after deposition of the Cr-alloy layer. This step may be performed prior to deposition of a protective overcoat. The magnetic recording media could further comprise a Cr-containing grain isolation layer Preferably, the Cr from said grain isolation layer diffuses into the grain boundaries of the magnetic domains within the first magnetic layer, but not within the domains (grains) of the first magnetic layer.

Determination of the composition of the phases in the magnetic layers could be performed by persons skilled in the art by transmission electron microscopy (TEM), energy dispersion spectroscopy (EDS) or electron energy loss spectroscopy (EELS).

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations that can be practiced throughout the disclosed numerical ranges. Finally, the entire disclosure of the patents and publications referred in this application are hereby incorporated herein by reference.

What is claimed is:

1. A magnetic recording medium comprising a substrate, an underlayer possessing an fcc lattice structure, and a magnetic layer with an hcp (101-2) plane being parallel to the surface of the substrate, wherein an easy magnetization axis in the magnetic layer is tilted away from the (101-2) plane.

2. The magnetic recording medium of claim 1, wherein the (101-2) plane is a Co(101-2) plane.

3. The magnetic recording medium of claim 1, wherein the easy magnetization axis is tilted about 45° away from the (101-2) plane.

4. The magnetic recording medium of claim 2, wherein the easy magnetization axis is tilted about 45° away from the surface of the substrate.

5. The magnetic recording medium of claim 1, wherein a mismatch between the lattice unit of the underlayer material and that of the hcp lattice of the magnetic material of the magnetic layer is less than 10%.

6. The magnetic recording medium of claim 1, wherein the underlayer is directly in contact with the magnetic layer.

7. The magnetic recording medium of claim 1, wherein the magnetic material is Co or a Co-containing alloy.

8. The magnetic recording medium of claim 1, wherein the underlayer material is selected from the group consisting of Ni, Al, Rh, Pd, Ag, Ir, Pt, Au, Pb, Th, Ce and Yb.

9. A method of manufacturing a magnetic recording medium comprising obtaining a substrate, depositing an underlayer possessing an fcc lattice structure, and depositing a magnetic layer on the substrate, the magnetic layer comprising a magnetic material with an hcp (101-2) plane being parallel to a surface of the substrate, wherein an easy magnetization axis in the magnetic layer is tilted away from the (101-2) plane.

10. The method of claim 9, wherein the (101-2) plane is a Co(101-2) plane.

11. The method of claim 9, wherein the easy magnetization axis is tilted about 45° away from the (101-2) plane.

12. The method of claim 10, wherein the easy magnetization axis is tilted about 45° away from the surface of the substrate.

13. The method of claim 9, wherein a mismatch between the lattice unit of the underlayer material and that of the hcp lattice of the magnetic material of the magnetic layer is less than 10%.

14. The method of claim 9, wherein the underlayer is directly in contact with the magnetic layer.

15. The method of claim 9, wherein the magnetic material is Co or a Co-containing alloy.

16. The method of claim 9, wherein the underlayer material is selected from the group consisting of Ni, Al, Rh, Pd, Ag, Ir, Pt, Au, Pb, Th, Ce and Yb.

* * * * *